(12) United States Patent
Hohner et al.

(10) Patent No.: US 11,296,870 B2
(45) Date of Patent: Apr. 5, 2022

(54) KEY MANAGEMENT CONFIGURATIONS

(71) Applicant: SAP SE, Walldorf (DE)

(72) Inventors: Christoph Hohner, Walldorf (DE); Sascha Zorn, Walldorf (DE); Meinolf Block, Walldorf (DE); Martin Schindewolf, Walldorf (DE)

(73) Assignee: SAP SE, Walldorf (DE)

( * ) Notice: Subject to any disclaimer, the term of this patent is extended or adjusted under 35 U.S.C. 154(b) by 205 days.

(21) Appl. No.: 16/590,047

(22) Filed: Oct. 1, 2019

(65) Prior Publication Data

US 2021/0099289 A1    Apr. 1, 2021

(51) Int. Cl.
*H04L 9/08*    (2006.01)
*H04L 9/14*    (2006.01)

(52) U.S. Cl.
CPC .......... *H04L 9/0822* (2013.01); *H04L 9/0891* (2013.01); *H04L 9/0894* (2013.01); *H04L 9/14* (2013.01)

(58) Field of Classification Search
CPC ... H04L 9/0897; H04L 9/0822; H04L 9/0891; H04L 9/0894; H04L 9/14
See application file for complete search history.

(56) References Cited

U.S. PATENT DOCUMENTS

| | | | |
|---|---|---|---|
| 6,081,811 A * | 6/2000 | Nilsson | G06F 16/258 |
| 6,980,988 B1 * | 12/2005 | Demers | G06F 11/2064 |
| 10,176,435 B1 * | 1/2019 | Sarkar | G06N 20/00 |
| 2004/0109568 A1 * | 6/2004 | Slick | G06F 21/608 380/277 |
| 2009/0307275 A1 * | 12/2009 | Miyashita | G06F 12/1416 |
| 2013/0042146 A1 * | 2/2013 | Unger | G06F 11/3672 714/32 |
| 2014/0082749 A1 * | 3/2014 | Holland | G06F 21/645 726/29 |
| 2015/0269497 A1 * | 9/2015 | Barnett | G06F 21/77 705/51 |
| 2015/0271150 A1 * | 9/2015 | Barnett | H04L 63/0876 713/171 |
| 2016/0241389 A1 * | 8/2016 | Le Saint | H04L 9/0825 |
| 2017/0220617 A1 * | 8/2017 | Bortnikov | G06F 16/2329 |
| 2018/0225190 A1 * | 8/2018 | Nagpal | G06F 11/3672 |
| 2018/0331824 A1 * | 11/2018 | Racz | G08B 13/196 |

* cited by examiner

*Primary Examiner* — Mohammad A Siddiqi

(74) *Attorney, Agent, or Firm* — Mintz Levin Cohn Ferris Glovsky and Popeo, P.C.

(57) ABSTRACT

A method, a system, and a computer program product for performing key management configurations. One or more encryption keys for encrypting one or more data payloads for accessing one or more databases are received. The received encryption keys are compared to a plurality of encryption keys associated with the databases. Based on the comparison, a configuration of at least one database is changed using the received encryption keys. The changed configuration is stored.

20 Claims, 7 Drawing Sheets

FIG. 3

| Column name | Data type | Description |
|---|---|---|
| DATABASE_NAME | NVARCHAR(256) | The database name |
| CONFIGURATION_NAME | VARCHAR(20) | The name of the key management configuration |
| IS_ACTIVE | VARCHAR(5) ["TRUE"/"FALSE"] | Describes whether this configuration is used by LSS to define access |
| TYPE | VARCHAR(20) | Type of the external key management |
| CLIENT_VERSION | VARCHAR(12) | Version of the driver software |
| PROPERTIES | NCLOB | Reduced version of the JSON settings object that does not contain the "credentials" object as json document |

KEY MANAGEMENT CONFIGURATIONS

TECHNICAL FIELD

This disclosure relates generally to data processing and, in particular, to key management configurations, e.g., use of SQL commands for management of such configurations.

BACKGROUND

Security of software and/or hardware of a particular computing system is vital to operation of a company. Such security is typically managed through various applications, software and/or hardware system configurations, monitoring, command execution, cryptographic keys, services, etc. Such management may include key management systems (KMS) and/or hardware security management modules (HSM). Keys are used to encrypt data payloads during communications and need to be managed to ensure reliability, security, and effective uninterrupted operation of computing systems.

SUMMARY

In some implementations, the current subject matter relates to a computer-implemented method for performing key management configurations. The method may include receiving one or more encryption keys for encrypting one or more data payloads for accessing one or more databases, comparing the one or more received encryption keys to a plurality of encryption keys associated with the one or more databases, changing, based on the comparing, a configuration of at least one database in the one or more databases using the received one or more encryption keys, and storing the changed configuration.

In some implementations, the current subject matter may include one or more of the following optional features. Configuration change may include adding one or more received encryption keys to the plurality of encryption keys. The addition may include storing one or more key-value settings associated with the received encryption keys.

In some implementations, configuration change may include deleting one or more received encryption keys from the plurality of encryption keys. Configuration change may also include updating one or more encryption keys in the plurality of encryption keys using the received encryption keys. In this case, update may include updating one or more stored key-value settings associated with the updated encryption key.

In some implementations, at least one of the received encryption keys and the plurality of encryption keys may be associated with at least one of: a hardware security management system, a key management service, and a combination thereof.

In some implementations, the method may also include monitoring usage of the received encryption keys for encrypting one or more data payloads for accessing one or more databases, and executing the changing based on the monitoring.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 illustrates an exemplary table for monitoring key management configurations, according to some implementations of the current subject matter;

DETAILED DESCRIPTION

To address these and potentially other deficiencies of currently available solutions, one or more implementations of the current subject matter relate to methods, systems, articles of manufacture, and the like that may, in some implementations, provide an ability to use SQL commands to manage key management configurations.

Key management service is typically used to generate, distribute, and/or manage cryptographic keys in a computing systems, which includes generation, exchange, storage, use, crypto-shredding (destruction) and replacement of keys. As of KMS, cryptographic protocol design, key servers, user procedures, and/or protocols, may be implemented. KMS may be implemented between users and/or systems. Symmetric keys and/or asymmetric keys may be used as part of KMS. Symmetric keys may be identical for both encrypting and decrypting a particular message. Asymmetric keys or public keys may include two distinct linked keys (as part of public key infrastructure (PKI)).

In some cases, a hardware security module (HSM) may be a physical computing device that protects/manages digital keys for strong authentication and performs crypto-processing. A typical HSM can be a plug-in card, an external device that can be attached to a computer, a network server, etc., and/or any other device.

In some implementations, the current subject matter may be configured to perform management of key management configurations. The management may include performing at least one or more of the following functions: addition of keys, dropping or removal of keys, updating of keys, activation of keys, monitoring of key usages, enabling/disabling key configuration settings (e.g., for external HSM and/or KMS services), encryption of data payloads using keys, etc. and/or any other functions, and/or any combinations thereof. In some exemplary implementations, such management functions may be performed using one or more SQL commands that may be submitted through a server. The SQL commands may be used to allow switching over from a default local secure store (LSS) installation to, for example, using HSM and/or KMS, and/or vice versa. The SQL commands may be submitted to a server by a user, an application, a computing system, and/or any other entity. In some exemplary, non-limiting implementations, the key configuration management may be performed using one or more in-memory database systems, such as a High Performance Analytic Appliance ("HANA") system as developed by SAP SE, Walldorf, Germany.

Figure 1:
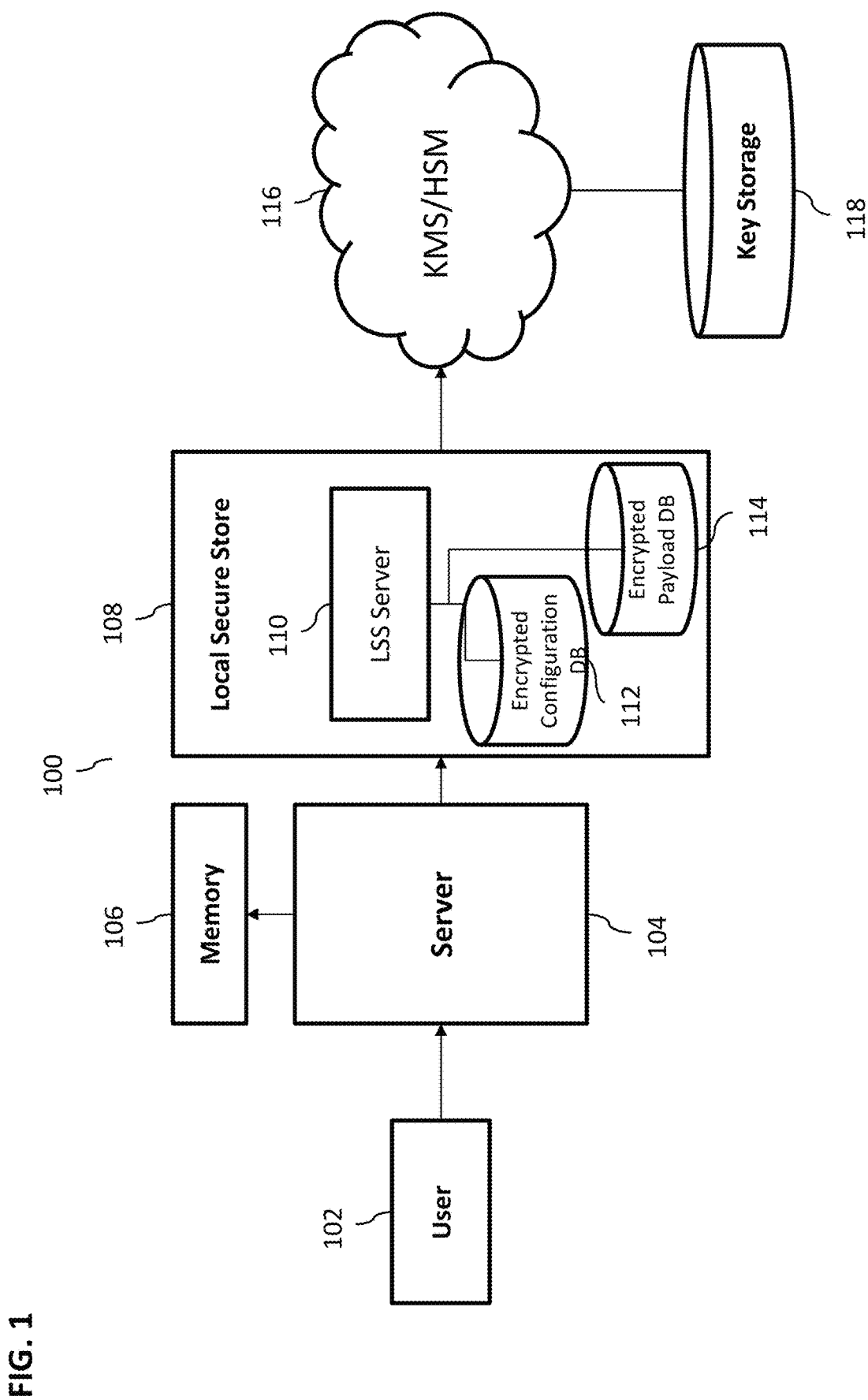
FIG. 1 illustrates an exemplary key management system, according to some implementations of the current subject matter.

FIG. 1 illustrates an exemplary key management system 100, according to some implementations of the current subject matter. The system 100 may include a user 102, a server 104 (e.g., a database index server ("hdbindexserver")), a memory 106 (e.g., a HANA memory appliance), a local secure store component 108, an external network 116, and a key storage component 118. The user 102 may be any user, which may include an individual user, a software application, a computing system, and/or any other entity. The user 102 may be configured to generate one or more of the commands (e.g., SQL commands) relating to key management configurations that may be used for encryption of data payloads. The commands may include adding a key configuration, updating a key configuration, dropping or deleting a key configuration, activating a key configuration (e.g., added key configuration, updated key configuration, etc.), and/or any other commands and/or any combinations thereof. The user 102 may be also configured to perform enablement of one or more settings for the external key management services and/or hardware security management systems, which may be part of the external network 116. Further, the user 102 may also be configured to perform monitoring of key usages using one or more interfaces that may be generated as a result of execution of any of the above commands.

The server 104 and/or the memory 106 may be configured to store various information related to data for which key configurations may be used to encrypt data payload. Additionally, the data backups, redo logs, traces, and/or any other information may be stored and/or may be accessed by the server 104 and/or memory 106.

The local secure store component 108 may include a local secure store (LSS) server 110 and one or more storage components that may persist external key management (e.g., for KMS/HSM) information, configuration information for KMS/HSM, and/or any other key management configuration information in an encrypted configuration database (DB) 112 (hereinafter, referred to as "configuration database" or "encrypted configuration database" or "configuration DB" or "encrypted configuration DB"). The LSS server 110 may also store encrypted payload data in a payload database (DB) 114. Using the LSS component 108, one or more key configurations may be added, updated, dropped, activated, monitored, etc.

The external network 116 may be operated independently of the remainder of the system 100 and may be configured to store one or more keys in a key storage 118. It may also store one or more RSA private keys for encryption purposes. The information relating to key configuration stored by the network 116 and/or key storage 118 may be used for payload decryption purposes. Data payload encryption/decryption may also be possible if the KMS/HSM services are enabled, otherwise, keys might not be retrieved and encryption/decryption might not be possible. The KMS/HSM services may be configured to generate new (or update existing ones, delete existing ones, etc.) encryption keys that may be stored in the key storage database 118.

Figure 2:
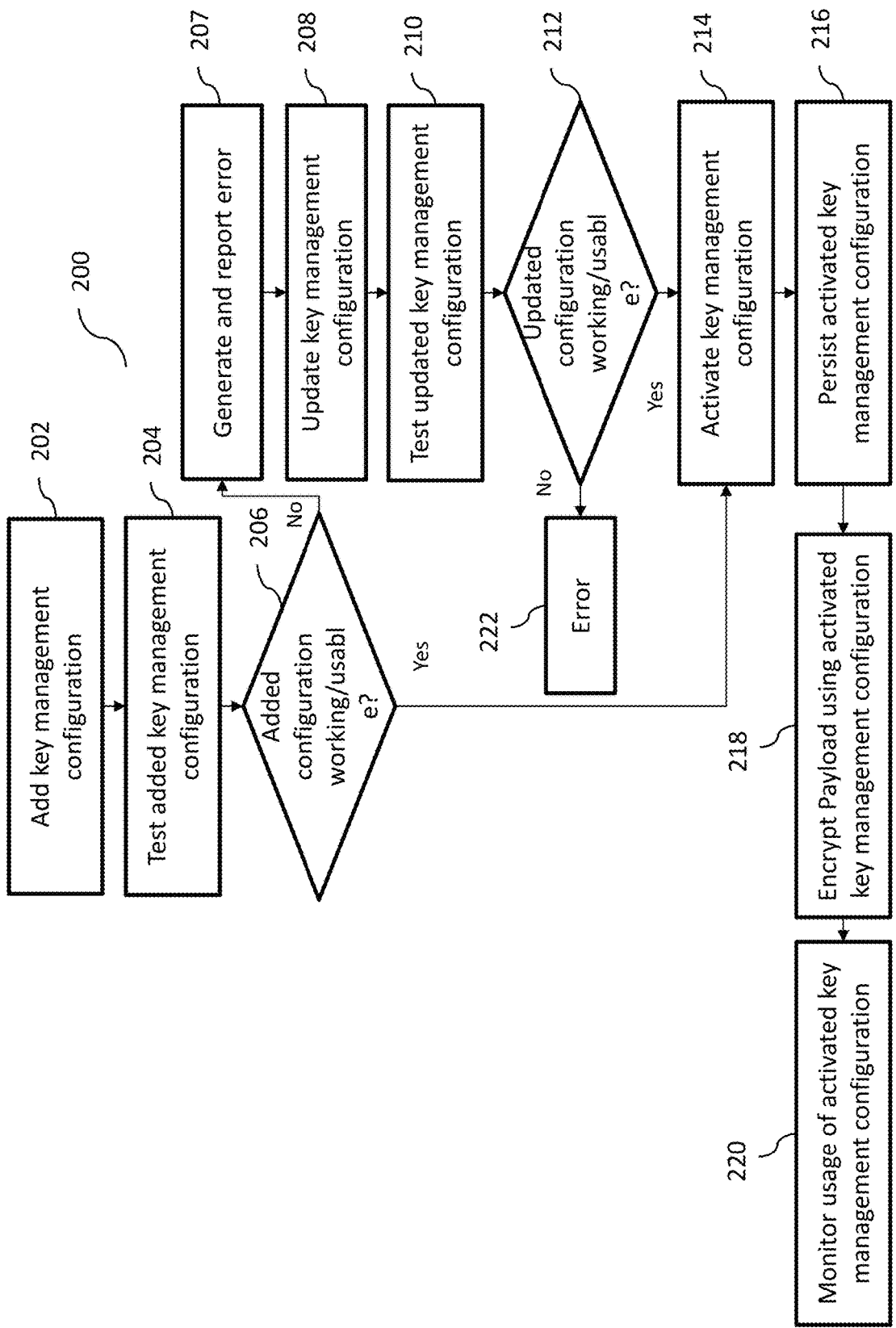
FIG. 2 illustrates an exemplary key management configuration process that may be performed by the system shown in FIG. 1, according to some implementations of the current subject matter.

FIG. 2 illustrates an exemplary key management configuration process 200 that may be performed by the system 100 shown in FIG. 1, according to some implementations of the current subject matter. At 202, the user 102 may wish to add a new key management configuration. This process may be initiated by the user 102 transmitting an SQL command to the server 104. The configuration may then be transmitted to LSS server 110, which may perform a test of the added key management configuration, at 204. The test may determine whether or not the added key management configuration is working and/or usable, at 206. The LSS server 110 may be configured to check with the configuration database 112 to determine workability and/or usability of the added key management configuration. If the test is successful, the added key management configuration may be activated, at 214.

If the added key management configuration is not workable/usable (e.g., having incorrect or wrong credentials for an external system), then an error may be generated and reported, at 207. Then, the LSS server 110 may be configured to perform an update of the key management configuration using the information related to the added key management configuration, at 208. The LSS server 110 may also test the updated key management configuration, at 210. If the test is not successful (e.g., updated configuration is not workable/usable), at 212, an error may be generated, at 222. Otherwise, the updated key management configuration may be activated, at 214, for use to encrypt data payloads.

The activated key management configuration may be persisted, at 216. The configuration database 112 may be configured to persist the activated key management configuration. The activated key management configuration may be used to encrypt data payloads, at 218, where the encrypted data payloads may be stored in the encrypted payload database 114.

In some implementations, the LSS server 110 may be configured to generate a view that may be used to monitor usage of the activated key management configuration (or any other configurations), at 220. The user 102 and/or any other computing component may be configured to perform monitoring of the activated key management configurations.

The LSS server 110 may be further configured to delete (or drop) a particular key management configuration. This may be performed to remove a particular configuration that is not being used (as, for example, determined as a result of monitoring), may be generating an error, may have been comprised, and/or for any other reason.

In some exemplary implementations, the above key management configurations may be executed as a SQL commands. For security purposes, such SQL commands may also require encryption root key administrator and/or the database administrator privileges. The SQL commands may be used to provide a general process for setting up HSM and/or KMS to ensure that vendor-specific, parameters and certificates are provided accordingly. For example, the SQL commands may be used, as part of HSM setup, for customer databases in cloud scenarios. Additionally, the SQL statements may be used to setup HSM usage for the SystemDB, tenant database (DB), etc.

In some exemplary, non-limiting implementations, the following SQL commands may be used from the SystemDB to control a tenant DB. The SQL commands for controlling the SystemDB may include "ALTER SYSTEM" (e.g., instead of "ALTER DATABASE <database_name>").

To add a key management configuration, the following SQL exemplary, non-limiting commands may be used

```
ALTER DATABASE <database_name>
    ADD KEY MANAGEMENT CONFIGURATION <config_name>
    PROPERTIES
'<settings> '
<database_name> ::= <identifier>
<config_name>
<settings>
```

The database name can be a name of the tenant database. The key management configuration name may include simple names in various formats (e.g., uppercase letters, e.g., 'EXTERNAL_CLOUD_HSM', where use of 'DEFAULT' may be forbidden). The settings may include a JSON-document with key-value settings, whereby a list of keys and their supported values may depend on the selected HSM and/or KMS. Using the above SQL command, a new key management configuration can be added and then tested. If the test is successful (i.e., the key management configuration name, specified settings, etc. are valid), the new key management configuration for a tenant may be stored in the LSS configuration database 112 (as shown in FIG. 1). The test might not be successful if the new key management configuration name is already in use, the specified settings do not work, and/or for any other reasons.

In order to remove a particular key management configurations, the following exemplary, non-limiting SQL command may be used.

```
ALTER DATABASE <database_name> DROP KEY
MANAGEMENT CONFIGURATION <config_name>
    <config_name>
```

As with the add SQL command above, key management configuration name may include any kind of name (e.g., a simple name, uppercase letters only, such as 'EXTERNAL_CLOUD_HSM', and/or name 'DEFAULT' may be forbidden). Using this SQL command, a key management configuration may be deleted from the LSS 108 (specifically, configuration database 112). However, the above drop SQL command may fail if the key management configuration exists and is currently active. The command may succeed if the configuration does not exist (e.g., idempotent) or exists but is not active.

To switch between key management configurations, the following SQL commands may be used.

```
ALTER DATABASE <database_name> ACTIVATE KEY
MANAGEMENT CONFIGURATION <config_name>
    <config_name>
```

Similarly to the add and drop SQL commands above, any names for the key management configurations may be used (e.g., simple names, uppercase letters, such as, 'EXTERNAL_CLOUD_HSM', however, in this case, 'DEFAULT' name may be used). The above SQL command may fail (thereby leaving everything unchanged), if the new key management configuration does not work.

To modify or alter key management configurations, the following SQL commands may be used.

```
ALTER DATABASE <database_name> ALTER KEY
MANAGEMENT CONFIGURATION <config_name> PROPERTIES
'<updates> '
    <database_name> ::= <identifier>
    <config_name>
    <updates>
```

The <database_name> may include a name of a database, such as a systemDB and/or a tenantDB. Key management configuration name may again be any name, such as a simple name, e.g., uppercase letters, such as, 'EXTERNAL_CLOUD_HSM', however, use of 'DEFAULT' may be prohibited. A JSON-document with new key-value settings may be included in the <updates>. As with the add command, this document may include a list of keys and their supported values that may depend on the selected HSM and/or KMS. Only the updates to the existing key management configurations listed in this document will be affected, whereas the remaining settings that are not listed in the updates will remain unchanged. A <null> value may be used to reset a particular value corresponding to a specific key management configuration.

Similar to the add SQL command, the key management configurations included in the update SQL command may be tested and if testing is successful, the updated key management configuration for a tenant DB may be stored in the configuration database 112 of the LSS 108. The update command test may fail if the updated settings cannot be implemented.

In some implementations, as stated above, the content of the '<settings>' parameter in the add SQL command may be a JSON document. The document may include the following sections: "setup", "service", "properties", and "credentials". The "setup" section may include optional information that may be handed over during the setup call execution that may be transmitted from the user (e.g., it may be handed over to LSS client). The setup section might not be stored in the configuration database 112. The "service" section may include information that may be analyzed by the LSS server 110. As part of the analysis, the LSS server 110 may evaluate "type," "client_version", "vendor", and "version". The "type" may be used to identify an executable for LSS client. The "client_version", "vendor" and "version" may be used to determine supported driver(s) information in a CommonDB database, which may then be forwarded to the LSS client. This information may also be viewed during monitoring that may be performed by the LSS server. The "properties" section may include various key identifiers and may be provided to the LSS client. The "credentials" section may include user credentials, such, as user ID and password, and might not be shown in the monitoring view (e.g., for security purposes). Further, the above sections of the <settings> JSON document may be stored in the configuration database 112. Below is an exemplary <settings> JSON document:

```
<settings> = {
    "setup": {
        "create_key": true
    },
    "service": {
        "type": "ExternalCloudHSM",
        "client_version": "2.4.1",
        "instance_name": "alpha"
    },
    "properties": {
        "slot": "HSM slot ID 0x5973ef7e",
        "key_id": "iasdoiuoas-aslkjasdh7657-dsasd"
    },
    "credentials": {
        "user": "wqeztrhv213167532187340",
        "password": "Pass1234"
    }
}
```

Referring back to FIG. 1, the configuration database 112 may include various information that may be related to the network hardware security management (network HSM) and/or key management service information. The network HSM may be accessed using a locally installed proprietary driver, whereby access control and authentication may be HSM vendor-specific. The configuration database 112 may store settings ('<settings>') parameters that may be used for the purposes of accessing the network HSM. These may be stored under key management configuration name (config_name) and may include "service", "properties", and "credentials" (which may be similar to the ones discussed above). In an exemplary, non-limiting implementation, the config_name parameter may be expressed as follows:

```
"service": {
    "type": "ExternalCloudHSM",
    "client_version": "2.4.1",
    "instance_name": "alpha"
},
    "properties": {
        "slot": "HSM slot ID 0x5973ef7e",
        "key_id": "iasdoiuoas-aslkjasdh7657-dsasd"
    },
    "credentials": {
        "user": "wqeztrhv213167532187340",
        "password": "Pass1234"
    }
}
```

In some implementations, the configuration database 112 may also store a public encryption key. The public encryption key may be used for encryption purposes without need for the HSM.

In some implementations, the configuration database 112 may also store information for accessing KMS (that may be vendor-specific and, hence, different for various KMS). An asymmetric key may be stored for encryption of body-encryption-key of the payload database 114. The KMS may be accessed for the purposes of encryption/decryption of the body-encryption-key of the payload.

In some implementations, once a particular key management configuration has been added, updated, etc., its usage may be monitored. Monitoring may be performed using a monitoring view that may be generated using system 100. For example, a monitoring view KEY_MANAGEMENT_CONFIGURATIONS in a schema SYS_DATA-BASES may be added to the SystemDB that lists stored key management configurations for all databases, and maybe a subset of their settings. The credentials object (e.g., user IDs, passwords, etc.) may be removed from the settings. A status column may indicate for HSMs if a particular key in the HSM is already backed up. Further, a similar view, without the column DATABASE_NAME, may be added to all tenants and the SystemDB as "SYS". "KEY_MANAGEMENT_CONFIGURATIONS". In some implementations, use of the view KEY_MANAGEMENT_CONFIGURATIONS in a schema SYS_DATABASES (in SystemDB) may require a database administrator privilege. Further, use of the view KEY_MANAGEMENT_CONFIGURATIONS in a schema SYS may require encryption root key administrator privilege.

FIG. 3 illustrates an exemplary table 300 for monitoring key management configurations, according to some implementations of the current subject matter. The table 300 may include a column 302 that may include column name, e.g., "database_name", "configuration_name", "is_active", "type", "client_version", "properties". Each column name may have a corresponding datatype as shown in column 304. For example, the "database_name" may have a datatype of nvarchar(256) and may describe a database name (as shown in column 306). The "configuration_name" may have a datatype varchar(20) and may describe a name of a key management configuration. The "is_active" name may have a datatype varchar(5) ["TRUE"/"FALSE"] and may describe whether a particular key management configuration is used by the LSS 108 to define access to specific computing components (e.g., in HANA system). The "type" may have a datatype varchar(20) and may describe a type of an external key management. The "client_version" may have a datatype varchar(12) and may describe a version of a driver software for which a specific key management configuration is being generated/used/etc. The "properties" may have a datatype nclob and may refer to a reduced version of the JSON settings (as discussed above) object that might not include "credentials" object in the JSON document.

In some exemplary implementations, the values of the above parameters may be set to a default value, corresponding to a no configuration in the LSS and may be expressed as follows:

```
CONFIGURATION_NAME = "DEFAULT"
IS_ACTIVE = "TRUE"
TYPE = "internal"
CLIENT_VERSION = ""
PROPERTIES = ""
```

With a change in configuration, e.g., an external cloud HSM, the above configuration may be changed as follows:

```
CONFIGURATION_NAME = "EXTERNAL_CLOUD_HSM"
IS_ACTIVE = "TRUE"
TYPE = "ExternalCloudHSM"
CLIENT_VERSION = "2.4.1"
PROPERTIES = "{
    "user": "wqeztrhv213167532187340",
    "slot": "HSM slot ID 0x5973ef7e",
    "key_id": "iasdoiuoas-aslkjasdh7657-dsasd"
}"
```

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 4:
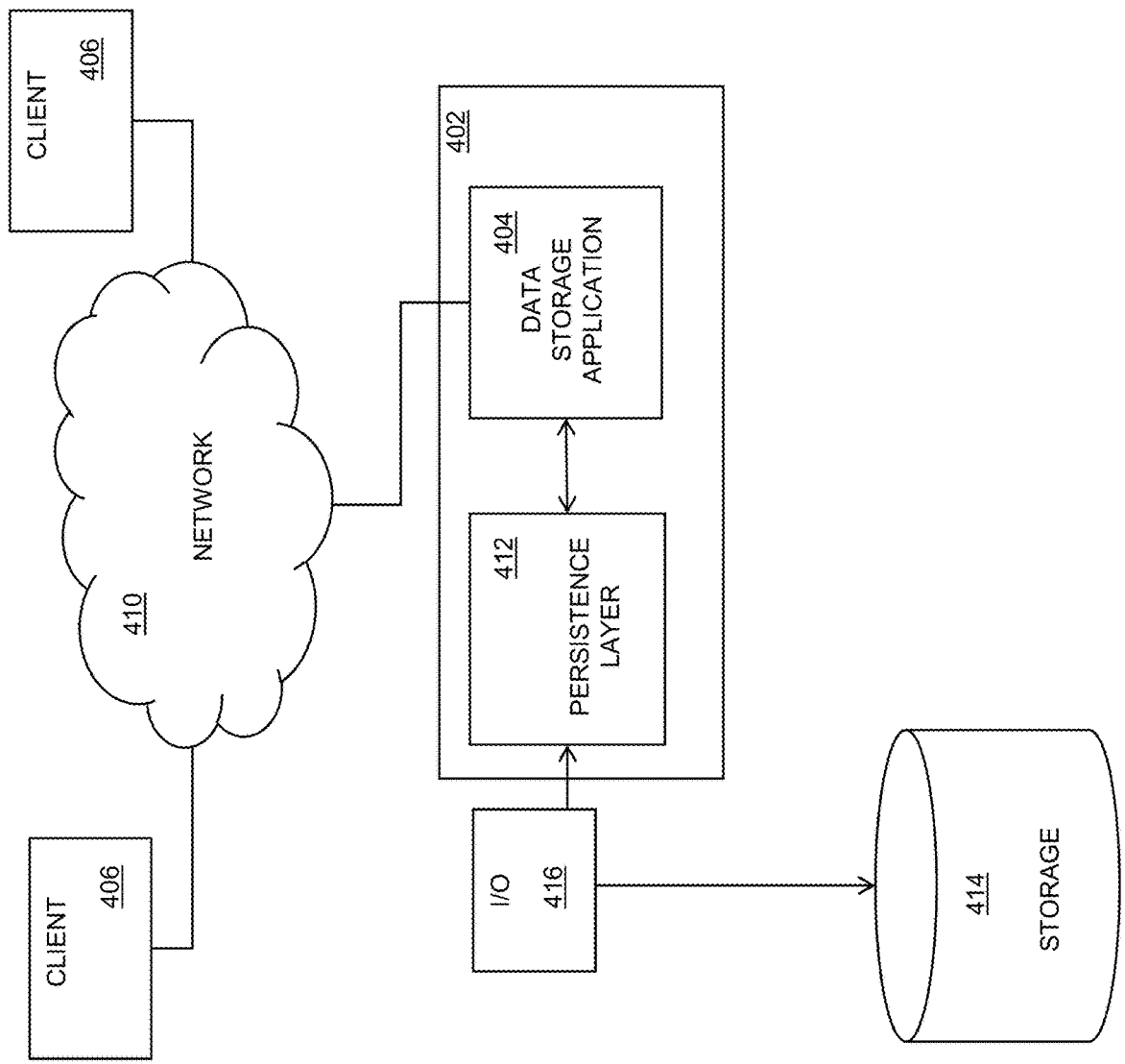
FIG. 4 is a diagram illustrating an exemplary system including a data storage application, according to some implementations of the current subject matter.

FIG. 4 illustrates an exemplary system 400 in which a computing system 402, which may include one or more programmable processors that may be collocated, linked over one or more networks, etc., executes one or more modules, software components, or the like of a data storage application 404, according to some implementations of the current subject matter. The data storage application 404 may include one or more of a database, an enterprise resource program, a distributed storage system (e.g. NetApp Filer available from NetApp of Sunnyvale, Calif.), or the like.

The one or more modules, software components, or the like may be accessible to local users of the computing system 402 as well as to remote users accessing the computing system 402 from one or more client machines 406 over a network connection 410. One or more user interface screens produced by the one or more first modules may be displayed to a user, either via a local display or via a display associated with one of the client machines 406. Data units of the data storage application 404 may be transiently stored in a persistence layer 412 (e.g., a page buffer or other type of temporary persistency layer), which may write the data, in the form of storage pages, to one or more storages 414, for example via an input/output component 416. The one or more storages 414 may include one or more physical storage media or devices (e.g. hard disk drives, persistent flash memory, random access memory, optical media, magnetic media, and the like) configured for writing data for longer term storage. It should be noted that the storage 414 and the input/output component 416 may be included in the computing system 402 despite their being shown as external to the computing system 402 in FIG. 4.

Data retained at the longer term storage 414 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 5:
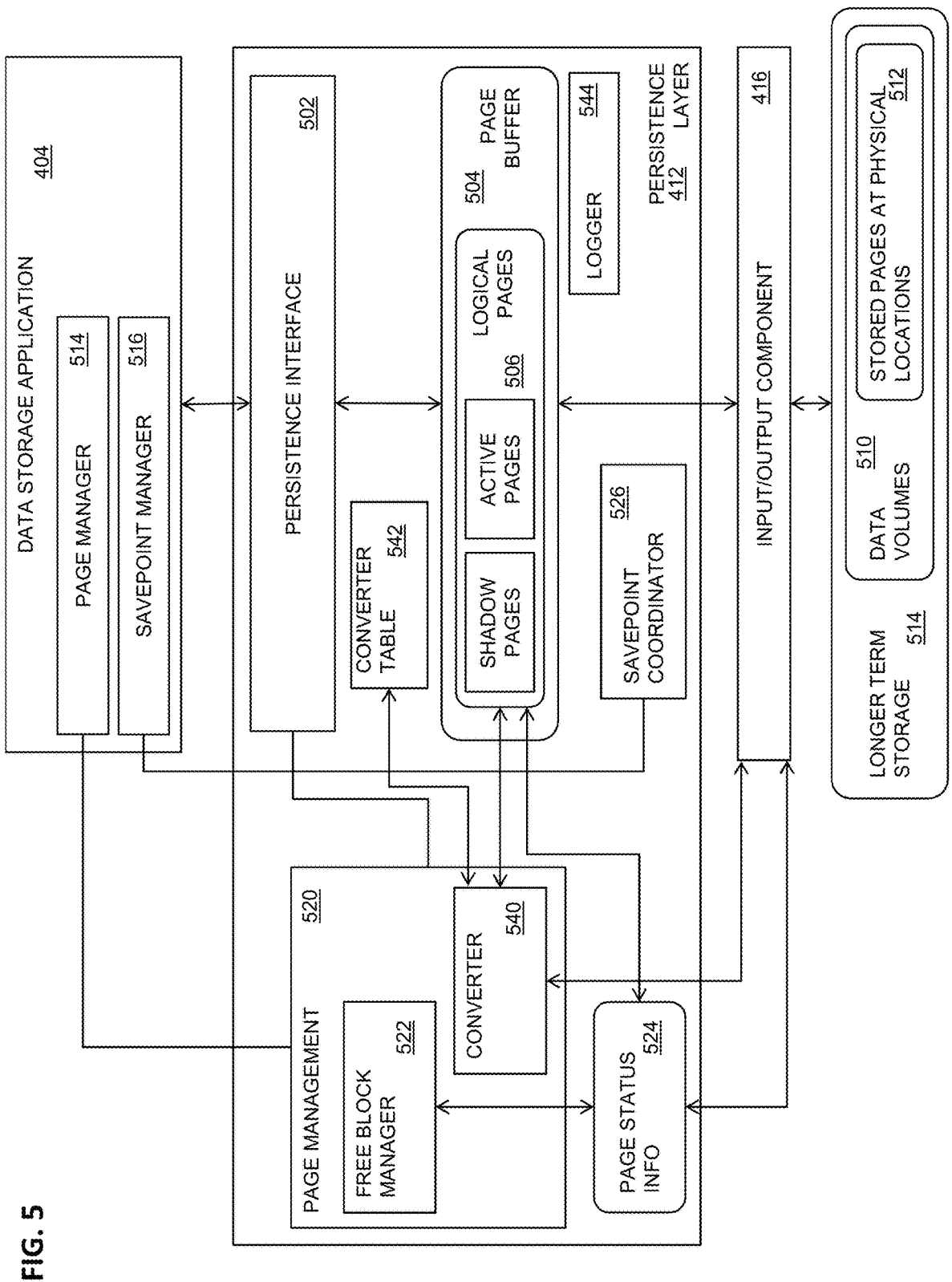
FIG. 5 is a diagram illustrating details of the system of FIG. 4.

FIG. 5 illustrates exemplary software architecture 500, according to some implementations of the current subject matter. A data storage application 404, which may be implemented in one or more of hardware and software, may include one or more of a database application, a network-attached storage system, or the like. According to at least some implementations of the current subject matter, such a data storage application 404 may include or otherwise interface with a persistence layer 412 or other type of memory buffer, for example via a persistence interface 502. A page buffer 504 within the persistence layer 412 may store one or more logical pages 506, and optionally may include shadow pages, active pages, and the like. The logical pages 506 retained in the persistence layer 412 may be written to a storage (e.g. a longer term storage, etc.) 414 via an input/output component 416, which may be a software module, a sub-system implemented in one or more of software and hardware, or the like. The storage 414 may include one or more data volumes 510 where stored pages 512 are allocated at physical memory blocks.

In some implementations, the data storage application 404 may include or be otherwise in communication with a page manager 514 and/or a savepoint manager 516. The page manager 514 may communicate with a page management module 520 at the persistence layer 412 that may include a free block manager 522 that monitors page status information 524, for example the status of physical pages within the storage 414 and logical pages in the persistence layer 412 (and optionally in the page buffer 504). The savepoint manager 516 may communicate with a savepoint coordinator 526 at the persistence layer 412 to handle savepoints, which are used to create a consistent persistent state of the database for restart after a possible crash.

In some implementations of a data storage application 404, the page management module of the persistence layer 412 may implement a shadow paging. The free block manager 522 within the page management module 520 may maintain the status of physical pages. The page buffer 504 may include a fixed page status buffer that operates as discussed herein. A converter component 540, which may be part of or in communication with the page management module 520, may be responsible for mapping between logical and physical pages written to the storage 414. The converter 540 may maintain the current mapping of logical pages to the corresponding physical pages in a converter table 542. The converter 540 may maintain a current mapping of logical pages 506 to the corresponding physical pages in one or more converter tables 542. When a logical page 506 is read from storage 414, the storage page to be loaded may be looked up from the one or more converter tables 542 using the converter 540. When a logical page is written to storage 414 the first time after a savepoint, a new free physical page is assigned to the logical page. The free block manager 522 marks the new physical page as "used" and the new mapping is stored in the one or more converter tables 542.

The persistence layer 412 may ensure that changes made in the data storage application 404 are durable and that the data storage application 404 may be restored to a most recent committed state after a restart. Writing data to the storage 414 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 544 may also be included to store the changes made to the data of the data storage application in a linear log. The logger component 544 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 544 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 412 may use a combination of undo log entries (from one or more logs) and shadow paging.

The persistence interface 502 may handle read and write requests of stores (e.g., in-memory stores, etc.). The persistence interface 502 may also provide write methods for writing data both with logging and without logging. If the logged write operations are used, the persistence interface 502 invokes the logger 544. In addition, the logger 544 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 544. For an entry of type "update", for example, this would be the identification of the affected record and the after image of the modified data.

When the data application 404 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 544 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 544 may write a database log (or simply referred to herein as a "log") sequentially into a memory buffer in natural order (e.g., sequential order, etc.). If several physical hard disks/storage devices are used to store log data, several log partitions may be defined. Thereafter, the logger 544 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 404 may use shadow paging so that the savepoint manager 516 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 6:
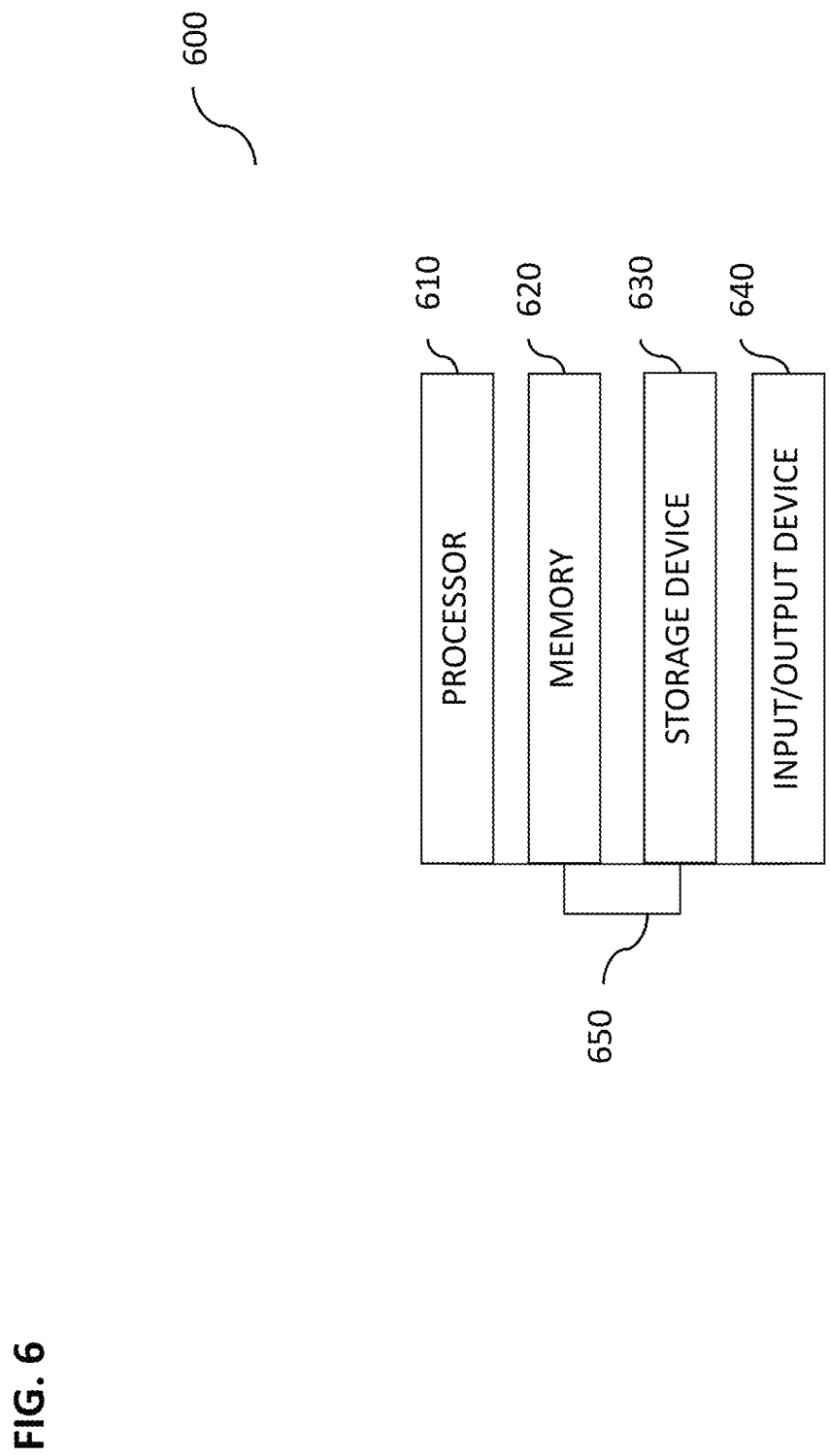
FIG. 6 is an exemplary system, according to some implementations of the current subject matter.

In some implementations, the current subject matter may be configured to be implemented in a system 600, as shown in FIG. 6. The system 600 may include a processor 610, a memory 620, a storage device 630, and an input/output device 640. Each of the components 610, 620, 630 and 640 may be interconnected using a system bus 650. The processor 610 may be configured to process instructions for execution within the system 600. In some implementations, the processor 610 may be a single-threaded processor. In alternate implementations, the processor 610 may be a multi-threaded processor. The processor 610 may be further configured to process instructions stored in the memory 620 or on the storage device 630, including receiving or sending information through the input/output device 640. The memory 620 may store information within the system 600. In some implementations, the memory 620 may be a computer-readable medium. In alternate implementations, the memory 620 may be a volatile memory unit. In yet some implementations, the memory 620 may be a non-volatile memory unit. The storage device 630 may be capable of providing mass storage for the system 600. In some implementations, the storage device 630 may be a computer-readable medium. In alternate implementations, the storage device 630 may be a floppy disk device, a hard disk device, an optical disk device, a tape device, non-volatile solid state memory, or any other type of storage device. The input/output device 640 may be configured to provide input/output operations for the system 600. In some implementations, the input/output device 640 may include a keyboard and/or pointing device. In alternate implementations, the input/output device 640 may include a display unit for displaying graphical user interfaces.

Figure 7:
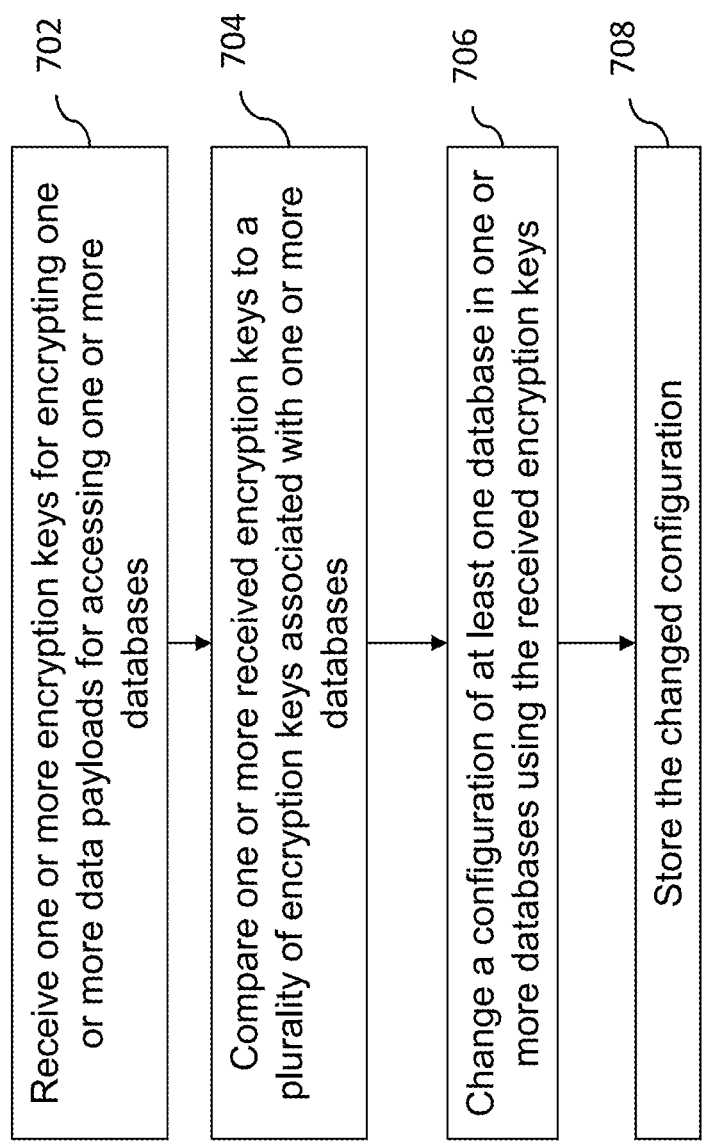
FIG. 7 is an exemplary method, according to some implementations of the current subject matter.

FIG. 7 illustrates an exemplary method 700 for performing key management configurations, according to some implementations of the current subject matter. At 702, one or more encryption keys for encrypting one or more data payloads for accessing one or more databases may be received. These may be received in a form of one or more SQL commands. At 704, the received encryption keys may be compared to a plurality of encryption keys associated with the databases. This may involve testing the received key configurations to determine whether they are valid or not, may be in use, etc. At 706, a configuration of at least one database may be changed (e.g., configurations may be added, updated, dropped, updated, etc.) using the received encryption keys. At 708, the changed configuration may be stored (e.g., in the configuration database 112).

In some implementations, the current subject matter may include one or more of the following optional features. Configuration change may include adding one or more received encryption keys to the plurality of encryption keys. The addition may include storing one or more key-value settings associated with the received encryption keys.

In some implementations, configuration change may include deleting one or more received encryption keys from the plurality of encryption keys. Configuration change may also include updating one or more encryption keys in the plurality of encryption keys using the received encryption keys. In this case, update may include updating one or more stored key-value settings associated with the updated encryption key.

In some implementations, at least one of the received encryption keys and the plurality of encryption keys may be associated with at least one of: a hardware security management system, a key management service, and a combination thereof.

In some implementations, the method may also include monitoring usage of the received encryption keys for encrypting one or more data payloads for accessing one or more databases, and executing the changing based on the monitoring.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    receiving one or more encryption keys for encrypting one or more data payloads for accessing one or more databases, the one or more databases including a system database and one or more tenant databases, the one or more encryption keys forming one or more key management configurations being used by the system database to change configuration of the one or more tenant databases, the system database storing key management configurations for the one or more tenant databases, the receiving including testing the received one or more encryption keys to determine usability of the received one or more encryption keys;

comparing the tested one or more received encryption keys to a plurality of encryption keys associated with the one or more databases and included in the one or more stored key management configurations;

changing, based on the comparing, a configuration of at least one tenant database in the one or more databases using the received one or more encryption keys, the changing one or more properties associated with the changed configuration to generate one or more altered key management configurations and testing the one or more altered key management configuration to determine usability of the one or more altered key management configuration with the at least one tenant database; and storing the tested changed configuration.

2. The method according to claim 1, wherein the changing the configuration of the at least one database includes adding the one or more received encryption keys to the plurality of encryption keys.

3. The method according to claim 2, wherein the adding includes storing one or more key-value settings associated with the one or more received encryption keys.

4. The method according to claim 1, wherein the changing the configuration of the at least one database includes deleting the one or more received encryption keys from the plurality of encryption keys.

5. The method according to claim 1, wherein the changing the configuration of the at least one database includes updating one or more encryption keys in the plurality of encryption keys using the one or more received encryption keys.

6. The method according to claim 5, wherein the updating includes updating one or more stored key-value settings associated with the one or more updated encryption keys.

7. The method according to claim 1, wherein at least one of the one or more received encryption keys and the plurality of encryption keys are associated with at least one of: a hardware security management system, a key management service, and a combination thereof.

8. The method according to claim 1, further comprising
monitoring usage of the one or more received encryption keys for encrypting one or more data payloads for accessing one or more databases; and
executing the changing based on the monitoring.

9. A system comprising:
at least one programmable processor; and
a non-transitory machine-readable medium storing instructions that, when executed by the at least one programmable processor, cause the at least one programmable processor to perform operations comprising:
receiving one or more encryption keys for encrypting one or more data payloads for accessing one or more databases, the one or more databases including a system database and one or more tenant databases, the one or more encryption keys forming one or more key management configurations being used by the system database to change configuration of the one or more tenant databases, the system database storing key management configurations for the one or more tenant databases, the receiving including testing the received one or more encryption keys to determine usability of the received one or more encryption keys;
comparing the tested one or more received encryption keys to a plurality of encryption keys associated with the one or more databases and included in the one or more stored key management configurations;
changing, based on the comparing, a configuration of at least one tenant database in the one or more databases using the received one or more encryption keys, the changing one or more properties associated with the changed configuration to generate one or more altered key management configurations and testing the one or more altered key management configuration to determine usability of the one or more altered key management configuration with the at least one tenant database; and
storing the tested changed configuration.

10. The system according to claim 9, wherein the changing the configuration of the at least one database includes adding the one or more received encryption keys to the plurality of encryption keys.

11. The system according to claim 10, wherein the adding includes storing one or more key-value settings associated with the one or more received encryption keys.

12. The system according to claim 9, wherein the changing the configuration of the at least one database includes deleting the one or more received encryption keys from the plurality of encryption keys.

13. The system according to claim 9, wherein the changing the configuration of the at least one database includes updating one or more encryption keys in the plurality of encryption keys using the one or more received encryption keys.

14. The system according to claim 13, wherein the updating includes updating one or more stored key-value settings associated with the one or more updated encryption keys.

15. The system according to claim 9, wherein at least one of the one or more received encryption keys and the plurality of encryption keys are associated with at least one of: a hardware security management system, a key management service, and a combination thereof.

16. The system according to claim 9, wherein the operations further comprise
monitoring usage of the one or more received encryption keys for encrypting one or more data payloads for accessing one or more databases; and
executing the changing based on the monitoring.

17. A computer program product comprising a non-transitory machine-readable medium storing instructions that, when executed by at least one programmable processor, cause the at least one programmable processor to perform operations comprising:
receiving one or more encryption keys for encrypting one or more data payloads for accessing one or more databases, the one or more databases including a system database and one or more tenant databases, the one or more encryption keys forming one or more key management configurations being used by the system database to change configuration of the one or more tenant databases, the system database storing key management configurations for the one or more tenant databases, the receiving including testing the received one or more encryption keys to determine usability of the received one or more encryption keys;
comparing the tested one or more received encryption keys to a plurality of encryption keys associated with the one or more databases and included in the one or more stored key management configurations;
changing, based on the comparing, a configuration of at least one tenant database in the one or more databases using the received one or more encryption keys, the changing one or more properties associated with the changed configuration to generate one or more altered key management configurations and testing the one or more altered key management configuration to determine usability of the one or more altered key management configuration with the at least one tenant database; and storing the tested changed configuration.

18. The computer program product according to claim 17, wherein the changing the configuration of the at least one database includes adding the one or more received encryption keys to the plurality of encryption keys, wherein the adding includes storing one or more key-value settings associated with the one or more received encryption keys.

19. The computer program product according to claim 17, wherein the changing the configuration of the at least one database includes deleting the one or more received encryption keys from the plurality of encryption keys.

20. The computer program product according to claim 17, wherein the changing the configuration of the at least one database includes updating one or more encryption keys in the plurality of encryption keys using the one or more received encryption keys, wherein the updating includes updating one or more stored key-value settings associated with the one or more updated encryption keys.

* * * * *